Nov. 21, 1961  C. L. JOHNSON  3,009,671
AIRCRAFT EXTERNAL FUEL TANK
Filed April 30, 1959

INVENTOR.
CLARENCE L. JOHNSON
BY George A. Sullivan
AGENT

United States Patent Office 3,009,671
Patented Nov. 21, 1961

3,009,671
AIRCRAFT EXTERNAL FUEL TANK
Clarence L. Johnson, Encino, Calif., assignor to Lockheed Aircraft Corporation, Burbank, Calif.
Filed Apr. 30, 1959, Ser. No. 810,092
4 Claims. (Cl. 244—135)

This invention relates to an aircraft fuel tank, and more particularly to a fuel tank of the type externally mounted around the wing of the aircraft.

Various types of fuel tanks mounted externally of an aircraft for extending the range thereof by supplementing the available fuel carrying capacity are known in the prior art. Such types include tanks that are commonly known in the art as belly tanks which are connected to the under sides or surfaces of the aircraft fuselage; wing tip tanks which are connected to the wing tips as the name implies; slipper tanks which are connected to the upper forward and under surfaces of the wings; and pylon tanks which are fastened to aerodynamic pylons connected to the under surfaces of the wings. While each of the tank types mentioned hereinbefore have been used successfully to accomplish their purpose of increasing the capable fuel capacity, and hence range, of the aircraft, there are also certain inherent features about each that create certain difficulties in the aircraft structure or lessen the aerodynamic potentialities attainable by the aircraft without being equipped with such tanks. For example external belly tanks require a strengthened fuselage structure increasing the weight of the airframe, provided there is sufficient clearance between the tank and ground when the aircraft is on its landing gear on the ground. They are also a potentially dangerous type of installation from a fire standpoint to the air crew or passengers should a forced belly landing or wheels-up landing be necessary by virtue of the fuel tank being substantially one of the first portions of the aircraft to touch the ground.

Wing tip tanks result in additional large loads being carried by the wing structure as the weight of the tank and fuel are located at the section of the wing farthest remote from the point of connection of the wing to the fuselage. In aircraft of the type having landing gear connected to the wings, such loads in the wing structure are additionally increased during landings as the tanks deflect downwardly the portion of the wing outboard of the point where the gear is connected.

Slipper and pylon type tanks create less forces on the wing structure than do tip tanks. However, they both still require a strengthened internal structure to which the tanks are connected for suspension therefrom. Likewise, they both have a potential danger from a fire standpoint in case of a belly or wheels-up forced landing, such danger potential being slightly less than that for belly tanks and slightly larger than that for wing tip tanks.

While all external type tanks increase the profile or aerodynamic drag of the aircraft, some tanks create more drag than others. For example, the plyon and belly tanks create more drag than the slipper tank as with the former type tanks there is a greater drag by the air stream flowing around only the tanks as compared to the latter type where the air stream flows around the tank and wing at the same time. By having the same air stream flowing around both the wing (which is necessary for lift) and the tank, there is less additional drag for the tank over the wing drag than if the tank were spatially separated from the wing and each of the separate wing and tank drag components were additive to their full individual component extents.

Accordingly, it is an object of this invention to provide an aircraft external fuel tank that is easily installed and removed relative to the aircraft.

A further object of this invention is to provide an aircraft external fuel tank resulting in greater degree of ground clearance while at the same time resulting in less loads required to be carried by the wing structure.

Another object of this invention is to provide an aircraft external fuel tank of a type that will result in the least amount of additional aerodynamic drag caused by the tank.

It is still a further object of this invention to provide an aircraft external fuel tank for mounting on an aircraft wing without requiring extensive fabrication and design complexities or beefing up of the wing structure.

Still another object of this invention is to provide an aircraft external type fuel tank of the type without having the entire or substantial portion of the weight of the tank depending from the bottom wing surface.

Other objects and advantages will become apparent from the following description taken in connection with the accompanying drawings showing one embodiment of the invention in which.

Figure 1:
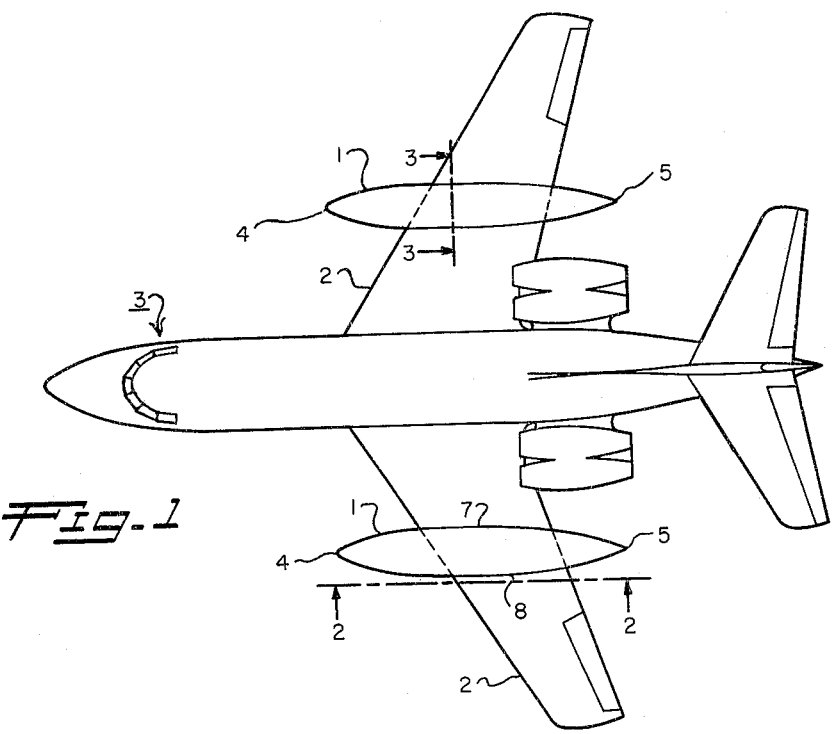
FIGURE 1 is a plan view of an aircraft having the external type tanks of this invention installed on the wings thereof.
Figure 2:
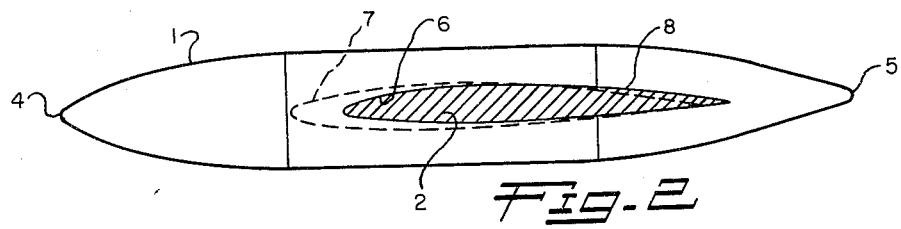
FIGURE 2 is a view taken along line 2—2 of FIGURE 1.

Generally speaking, this invention comprises a cylindrical tank aerodynamically shaped with a tip converging forward and aft portion, and having a diametrical type opening extending diametrically through the center portion of the tank so as to split such center section of the tank into an upper and lower compartment. The diametrical opening through the tank permits the tank to be mounted on an aircraft wing by sliding such tank span-wise over the wing from the wing tip in an inboard direction. By proper arrangement of the tank opening, the balance characteristics of the aircraft can be maintained in that any ratio of the tank volume forward of the diametrical opening relative to the volume aft of the opening can be such as desired. In essence, utilization of this invention permits the external fuel tank to be supported by placement on the wing rather than depending or hanging from the lower wing surfaces or extending from the tip of the wing thereby causing an increase of loads or forces on the wing structure by the lever arm created by the weight of the tank acting through the span of the wing from the point of connection of the wing to the fuselage.

Referring more particularly to the figures, an external fuel tank 1 as contemplated by this invention is shown mounted on wings 2 of aircraft 3. Tank 1 may be of substantially any shape desired, and as shown in the drawings consists of a generally cylindrical cross sectional shape converging to smooth aerodynamically efficient points or tips 4 and 5 at the forward and aft ends thereof.

Between the tip 4 and end 5 of tank 1 is an opening or slot 6 extending diametrically through tank 1 so as to split the interior compartment of the tank into two branches through the axial extent of the opening 6. While any desired cross sectional configuration of opening 6 may be utilized, the vertical cross sectional configuration axially of the tank of opening 6 as shown in the drawings conforms to the vertical cross sectional configuration chordally of wing 2. The shape sectional configuration chordally of wing 2. The shape of opening 6 in a plan view conforms to the plan view configuration of the wings 2 between the inboard and outboard locations 7 and 8 respectively of the tank wall on the wings of the aircraft when tank 1 is installed thereon.

Figure 3:
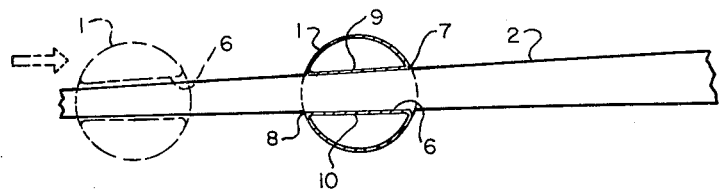
FIGURE 3 is a view of the tank installed on the wing as taken along line 3—3 of FIGURE 1, and shows in phantom the direction the external tank is moved for mounting on the wing of the aircraft.

Likewise, the cross sectional configuration of opening 6 in a plane normal to the axis of tank 1, as shown in FIGURE 3 shows a relative taper between the opening walls 9 and 10 of tank 1 in such a manner whereby the walls 9 and 10 converge in an outboard direction while they diverge in an inboard direction. While this is the usual shape of an aircraft wing in that there is a spanwise taper or reducing thickness from the inboard section of the wing to the outboard section, as indicated above, such taper of walls 9 and 10 of opening 6 is not necessary, the main criteria being that there is some kind of an opening extending through the tank which can be mounted on the wing by moving the tank span-wise along the wing of the aircraft, the wing passing through the opening thereby hanging the tank on the upper surface of the wing as shown by the phantomed details in FIGURE 3. Thus, the tank extends completely around the wing in a chord-wise direction and the weight thereof is supported on the wing by the upper opening wall 9 of tank 1 resting on top of the wing. Additionally, this does not require the extent of internal wing structure that would be necessary if the entire wing were hanging or depending from the lower surface thereof. This also permits the wing to take various flexural deflections both around a span-wise as well as a chordal axis with lower resultant loads on the wing structure than those created by such prior art tanks as discussed above.

To mount the tank 1 upon the wing 2, the tank is elevated to a point where the tip of wing 2 is in line with opening 6 of tank 1. Tank 1 is then moved in an inboard span-wise direction relative to the wing, with wing 2 located in and passing through opening 6. If the opening 6 is shaped to the plan view, vertical and transverse cross sectional configurations of the wing, the tank can be moved inboard to a point where the tank is prohibited from further inboard span-wise movement. When thus installed, the tank can be secured or connected to the wing by any appropriate means (not shown).

While a particular embodiment of the invention has been illustrated and described, it will be obvious to those skilled in the art that various changes and modifications may be made without departing from the invention and it is intended to cover in the appended claims all such changes and modifications that come within the true spirit and scope of this invention.

What is claimed is:

1. An aircraft external fuel tank of rigid construction for mounting at a pre-fixed location on an aircraft wing having a transverse diametric simple closed curve opening therethrough for span-wise passage of the aircraft wing when the tank is being mounted thereon, said tank completely surrounding the wing in a chord-wise plane when mounted thereon.

2. An aircraft external fuel tank of rigid construction for mounting at a prefixed location on an aircraft wing having a transverse diametric opening therethrough formed by a simple closed curve wall for span-wise passage of the aircraft wing when the tank is being mounted thereon, said closed curve wall shaped in confronting conformance to the wing chordal perimeter at the spanwise mounting location of said tank on the wing, said tank completely surrounding the wing in a chord-wise plane when mounted thereon.

3. An aircraft external fuel tank as claimed in claim 1 wherein the plan-wise configuration of the opening substantially conforms to the plan-wise configuration of the aircraft wing at that portion of the wing where the tank is mounted.

4. An aircraft external fuel tank as claimed in claim 1 wherein the cross sectional configuration of the opening normal to the axis of the tank conforms substantially to the span-wise cross sectional configuration of the aircraft wing at that portion of the wing where the tank is mounted.

References Cited in the file of this patent

UNITED STATES PATENTS

| | | |
|---|---|---|
| 1,499,817 | Fokker | July 1, 1924 |
| 1,527,735 | Hunsaker | Feb. 24, 1925 |
| 2,585,480 | Makhonine | Feb. 12, 1952 |
| 2,670,049 | Christie | Feb. 23, 1954 |